United States Patent [19]

MacMinn et al.

[11] Patent Number: 4,959,596
[45] Date of Patent: Sep. 25, 1990

[54] SWITCHED RELUCTANCE MOTOR DRIVE SYSTEM AND LAUNDERING APPARATUS EMPLOYING SAME

[75] Inventors: Stephen R. MacMinn, Schenectady; Charles M. Stephens, Pattersonville; Paul M. Szczesny, Burnt Hills, all of N.Y.

[73] Assignee: General Electric Company, Schenectady, N.Y.

[21] Appl. No.: 332,205

[22] Filed: Apr. 3, 1989

[51] Int. Cl.$^5$ .............................................. H02P 8/00
[52] U.S. Cl. ...................................... 318/254; 318/138
[58] Field of Search ........................ 318/254, 138, 701

[56] References Cited

U.S. PATENT DOCUMENTS

| | | | |
|---|---|---|---|
| 4,520,302 | 5/1985 | Hill et al. ............... | 318/696 |
| 4,556,827 | 12/1985 | Erdman .................. | 318/254 |
| 4,595,865 | 6/1986 | Jahns ..................... | 318/254 |
| 4,611,157 | 9/1986 | Miller et al. ............ | 318/696 |
| 4,707,650 | 11/1988 | Bose ...................... | 318/685 |
| 4,739,240 | 4/1988 | MacMinn et al. ....... | 318/696 |
| 4,772,839 | 9/1988 | MacMinn et al. ....... | 318/696 |
| 4,777,419 | 10/1988 | Obradovic .............. | 318/696 |
| 4,777,579 | 10/1988 | Jahns et al. ............. | 363/98 |
| 4,783,690 | 11/1988 | Walden et al. .......... | 357/23.4 |
| 4,819,460 | 4/1989 | Obradovic .............. | 68/23.7 |

OTHER PUBLICATIONS

MacMinn, S. R. et al., "Application of Sensor Integration Techniques to Switched Reluctance Motor Drives", Proc. of 1988 IEEE Ind. Appl. Soc. Annual Conf., Pittsburgh, Pa., Oct. 2-6, 1988, pp. 584-588.

Harris, W. D. et al., "A Simple Motion Estimator for Variable-Reluctance Motors", Proc. of 1988 IEEE Ind. Appl. Soc. Annual Conf., Pittsburgh, Pa., Oct. 2-6, 1988, pp. 281-286.

Primary Examiner—Bernard Roskoski
Attorney, Agent, or Firm—Jill M. Breedlove; James C. Davis, Jr.; Marvin Snyder

[57] ABSTRACT

A microcomputer-based drive system for a switched reluctance motor requires no rotor position sensor and no discrete current sensors. Phase excitation is synchronized with rotor position by indirectly estimating rotor position according to instantaneous phase inductance. Current regulation is achieved by incorporating pilot devices for current sensing into the switching devices of the power converter and by employing a fixed off-time current chopping strategy. One application is for use in a laundering machine.

30 Claims, 13 Drawing Sheets

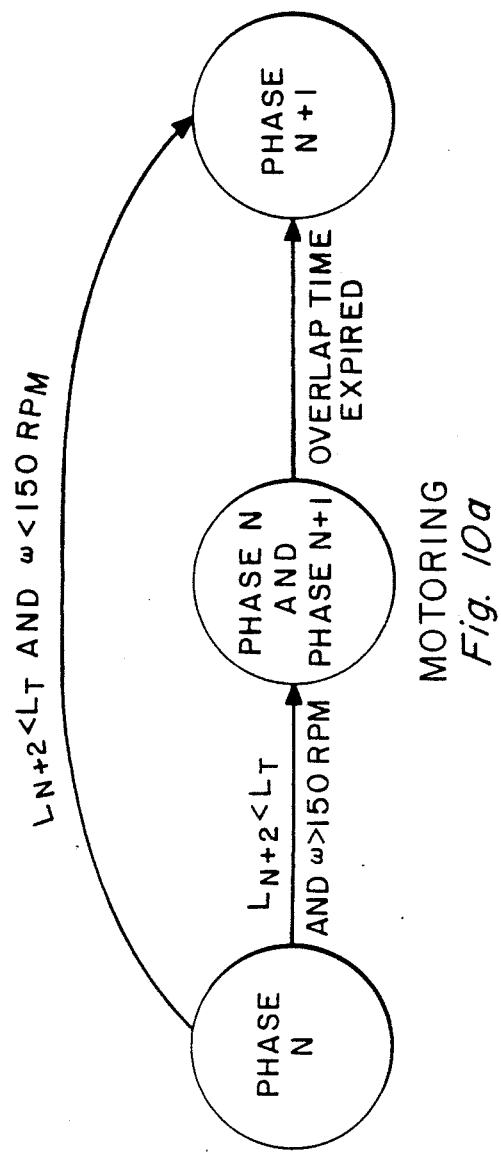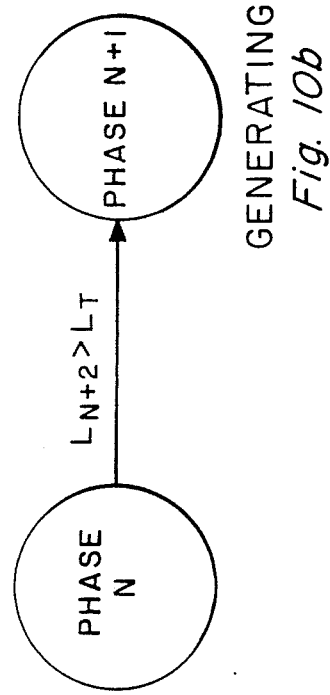

4,959,596

SWITCHED RELUCTANCE MOTOR DRIVE SYSTEM AND LAUNDERING APPARATUS EMPLOYING SAME

FIELD OF THE INVENTION

The present invention relates generally to a drive system for a switched reluctance motor. More particularly, this invention relates to a highly integrated, microcomputer-based switched reluctance motor drive, which does not require a rotor position sensor or discrete current sensors, and which is suitable for operating laundering apparatus.

BACKGROUND OF THE INVENTION

A conventional laundering machine employs a constant-speed motor to drive an agitator and a coaxially arranged laundry basket. The agitator rotates in a back-and-forth motion for agitating fluid and fabrics in the laundry basket during an agitate mode, the agitator oscillation being relatively slow compared with the motor speed. Rotation of the basket during a spin mode for effecting centrifugal displacement of fluid and particulate matter from the fabrics, however, is unidirectional at a speed appreciably greater than that of the agitator oscillation. Thus, a complex transmission is required to adapt the constant-speed motor to operate the laundering machine in both the agitate and spin modes. As a further disadvantage, there is a large volume requirement for housing such motor and transmission systems.

To overcome the aforementioned shortcomings, adjustable speed drives comprising electronically commutated motors (ECMs) for use in laundering machines have been developed. One such device is disclosed in U.S. Pat. No. 4,556,827 issued Dec. 3, 1985 to David M. Erdman and assigned to the instant assignee. The laundering apparatus of the cited patent includes an electronically commutated motor comprising: a stationary assembly; a multistage winding arrangement associated with the stationary assembly and having a plurality of winding stages adapted to be commutated in a plurality of preselected sequences; and rotatable means rotatably associated with the stationary assembly and arranged in selective magnetic coupling relation with the winding stages for driving the apparatus. Although the ECMs advantageously reduce the complexity, size and cost of laundering apparatus, it is desirable to reduce these factors even further. The present invention, therefore, utilizes a switched reluctance motor (SRM) drive system for operating laundering apparatus. In contrast to an ECM, a SRM requires no permanent magnets and no rotor windings. Hence, a SRM is both simple and economical in construction.

Switched reluctance motors conventionally have multiple poles on both the stator and the rotor; that is, they are doubly salient. There are phase windings on the stator, but no windings or magnets on the rotor. Each pair of diametrically opposite stator pole windings is connected in series to form an independent phase winding of the multiphase switched reluctance motor. Torque is produced by switching current in each phase winding in a predetermined sequence that is synchronized with angular position of the rotor, so that a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative or braking torque. The torque developed is independent of the direction of current flow, so that unidirectional current pulses synchronized with rotor movement can be applied to the stator phase windings by a converter using unidirectional current switching elements, such as thyristors or transistors.

A SRM drive operates by switching the stator phase currents on and off in synchronism with rotor position. By properly positioning the firing pulses relative to rotor angle, forward or reverse operation and motoring or generating operation can be obtained. Usually, the desired phase current commutation is achieved by feeding back a rotor position signal to a controller from a shaft position sensor, e.g. an encoder or a resolver. To improve reliability and to reduce size, weight, inertia, and cost in such drives, it is desirable to eliminate this shaft position sensor. To this end, various approaches have been previously proposed for indirect rotor position sensing by monitoring terminal voltages and currents of the motor. One such approach, referred to as waveform detection, depends upon back electromotive forces (EMF) and is, therefore, unreliable at low speeds and inoperative at zero speed. Such an approach would not be suitable for use in high-torque, low-speed laundering machines.

Another approach to indirect rotor position sensing is disclosed in commonly assigned U.S. Pat. No. 4,772,839, issued Sept. 20, 1988 to S. R. MacMinn and P. B. Roemer, which is incorporated by reference herein. The cited patent discloses an indirect position estimator for a SRM which applies low level sensing pulses of short duration to the unenergized motor phases. Application of the sensing pulses results in a change in current in each of the unenergized phases. The change in current is sensed by a current sensor and an estimated inductance value is derived therefrom. A pair of estimated rotor angles corresponding to the estimated inductance value for each of the unenergized phases is ascertained. One such pair is shifted by a value equal to a known phase displacement of the other unenergized phase. The pairs of estimated angles are then compared to determine which of the angles match. An estimated instantaneous rotor angular position equal to the matching angle is produced. Moreover, in case any of the stator phases undergoes a change in state during sampling or in case two phases do not remain energized throughout the sampling, an extrapolator is provided to generate an extrapolated rotor angular position instead of the estimated position.

Although the above-cited patent advantageously provides a method for indirectly determining rotor position so that a conventional rotor position sensor is not required, it is desirable to provide an even simpler method and associated apparatus. Further, it is desirable to eliminate the need for discrete current sensing devices which likewise add to the complexity, size, weight and cost of a SRM drive system. Such a "sensorless" system would improve and enhance the operational characteristics of SRMs and extend their applicability to, for example, consumer appliances.

OBJECTS OF THE INVENTION

Accordingly, it is an object of the present invention to provide a new and improved drive system for a switched reluctance motor.

Another object of this invention is to provide a microcomputer-based drive system for a SRM which is four-quadrant compatible.

Another object of the present invention is to provide a control system for a SRM which requires no rotor position sensor and no discrete current sensors.

Another object of this invention is to provide a method and apparatus for indirectly estimating rotor position in a SRM drive system.

Still another object of the present invention is to provide a SRM drive system which optimizes SRM performance in, and transitions between, a start-up state and four quadrants of operation.

Yet another object of the present invention is to provide a new and improved laundering machine, and a SRM drive system therefor, which is simple and inexpensive in construction.

SUMMARY OF THE INVENTION

The foregoing and other objects are achieved in a microcomputer-based drive system for a switched reluctance motor which enables four-quadrant operation (i.e. forward motoring, reverse motoring, forward generating, reverse generating). The new SRM drive system requires no rotor position sensor for synchronizing phase conduction pulses to rotor position, and no discrete current sensors for regulating phase current. In accordance with the present invention, an indirect method is provided for estimating rotor position, hereinafter referred to as "impedance sensing". According to this impedance sensing method, voltage sensing pulses are applied to an idle phase (i.e., one which is not producing torque). The change in phase current resulting from application of sensing pulses is inversely proportional to the instantaneous value of the phase inductance. Proper commutation time is determined by comparing this change in phase current to a threshold current, thus synchronizing phase excitation to the rotor position. Phase excitation can be advanced or retarded by decreasing or increasing the threshold, respectively.

Instead of conventional discrete current sensors, the SRM drive system of the present invention incorporates an integrated pilot current sensor into a respective switching device in each phase leg of the power converter. A fixed off-time current regulation strategy is used, since there is no output signal from a pilot current sensor when the corresponding switching device is off.

A new laundering machine beneficially employing the SRM drive system of the present invention is further provided. The new laundering machine preferably includes a four-phase, large-diameter, high-torque SRM.

The features and advantages of the present invention will become apparent from the following detailed description of the invention when read with the accompanying drawings.

BRIEF DESCRIPTION OF THE DRAWINGS

FIGS. 10a and 10b are sequence diagrams illustrating the motoring and generating modes, respectively, of a SRM operating with the control system of the present invention;

DETAILED DESCRIPTION OF THE INVENTION

Figure 1:
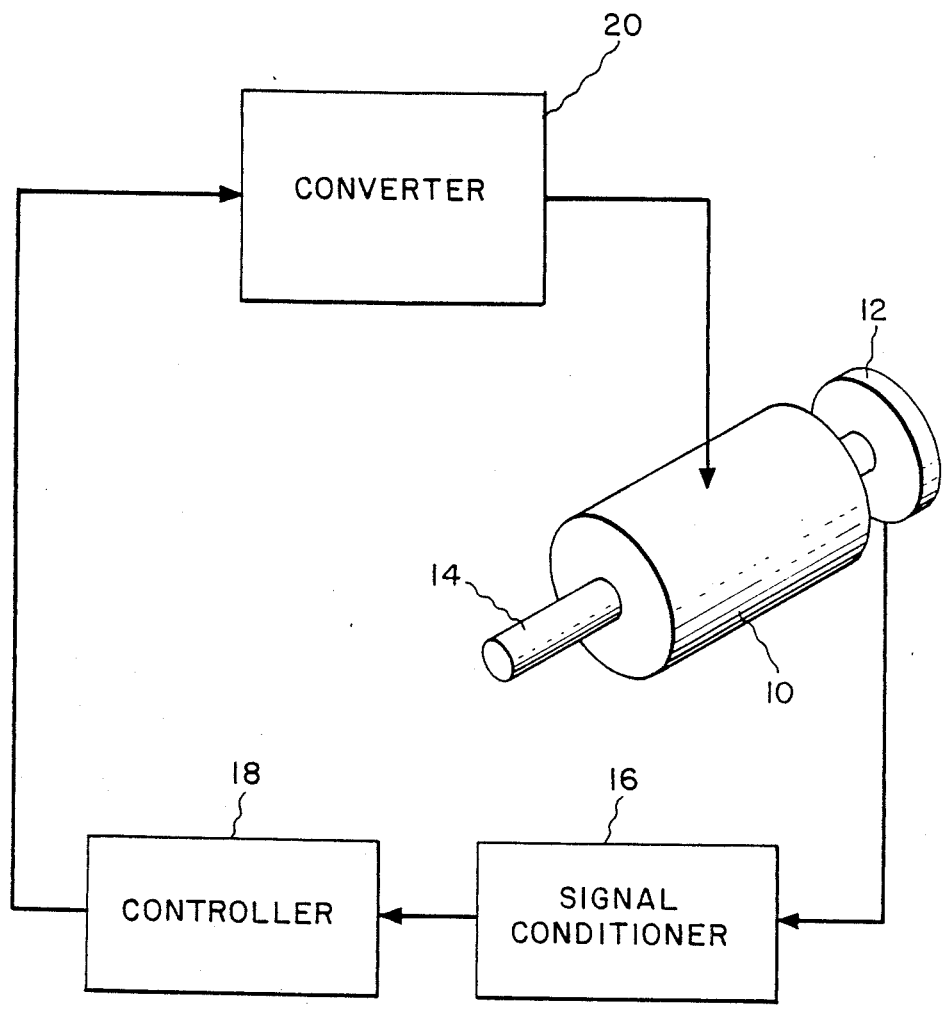
FIG. 1 is a block diagram illustrating a conventional SRM drive system employing a rotor position sensor.

FIG. 1 shows a conventional drive system for a switched reluctance motor (SRM) 10. As illustrated, such a drive system typically employs a position sensor 12 for measuring the angular position of a rotor 14, e.g. a resolver. The output signal from rotor position sensor 12 is conditioned in a signal conditioner 16, such as a resolver-to-digital converter or other suitable interfacing apparatus, which supplies an electrical signal representative of rotor angle to a controller 18. In well-known fashion, controller 18 provides commutation signals to a converter 20 which, in turn, produces drive signals for SRM 10. An exemplary controller and associated converter are described in commonly assigned U.S. Pat. No. 4,739,240, issued on Apr. 19, 1988 to S. R. MacMinn and P. M. Szczesny, which is incorporated by reference herein. Typically, discrete current sensors are coupled to a current regulator circuit (not shown) for controlling phase current amplitudes in a SRM. For example, individual low-resistance current shunts may be coupled to each phase winding to detect the current level in each phase. The output of each current shunt is connected to a separate potentiometer for setting the current limit. Another type of current regulator, which eliminates the need for discrete current sensors, is disclosed in commonly assigned U.S. Pat. No. 4,595,865, issued to T. M. Jahns on June 17, 1986, which is incorporated by reference herein.

In one aspect of the present invention, the rotor position sensor of the prior art system is eliminated. Accordingly, a method and apparatus are provided for indirectly estimating instantaneous rotor angular position. Moreover, the present invention eliminates the need for the aforesaid discrete current sensors. In another aspect of the present invention, a switched reluctance motor and a four-quadrant drive system are provided for a laundering machine.

Figure 2:
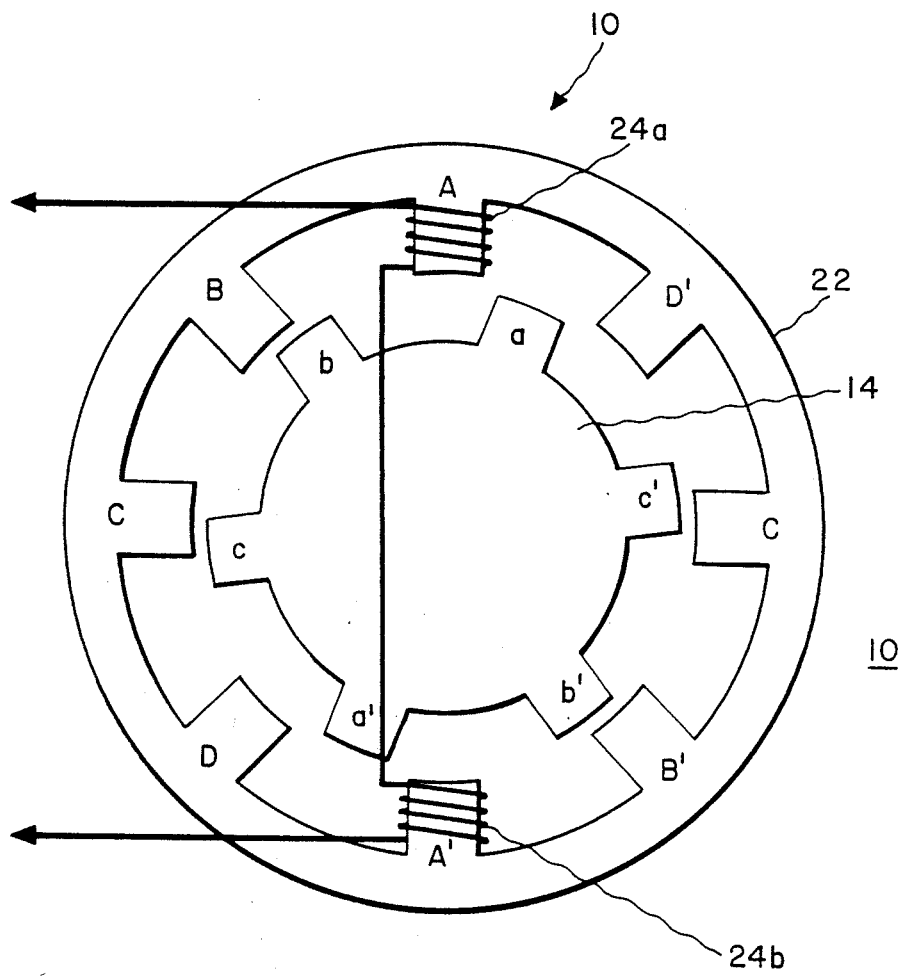
FIG. 2 is a cross-sectional view of a typical SRM.
Figure 3:
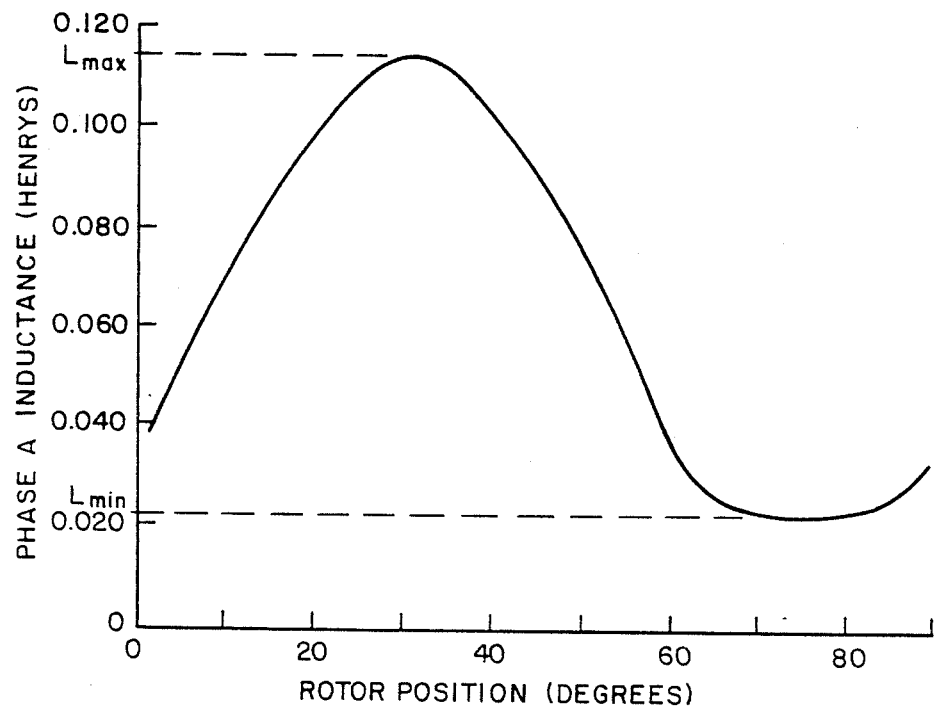
FIG. 3 is a graph of inductance versus rotor position for a stator pole pair of the SRM of FIG. 2.

There are two characteristics of a SRM that make indirect rotor position sensing possible. One is that a SRM exhibits a high degree of phase winding independence; that is, the phase windings are spatially, ohmically and magnetically isolated from each other. The other is that the inductance seen from the terminals of the stator phase windings is a strong function of rotor position due to the saliency of both the rotor and stator of a SRM. In FIG. 2, a typical four-phase SRM 10 is shown. It is to be understood, however, that the present invention is not limited to four-phase drives, but may be extended to SRMs having any number of phases. For this particular SRM, rotor 14 has three pairs of diametrically opposite rotor poles a-a', b-b', and c-c'; and stator 22 has four pairs of diametrically opposite stator poles A-A', B-B', C-C', and D-D'. The opposite poles of each stator pole pair share a common phase winding and define a respective stator phase. A representative winding 24 for Phase A is illustrated in FIG. 2. Similar windings (not shown) are provided for each of the other stator pole pairs. In operation, when a pair of rotor poles is aligned with the stator poles of Phase A, for example, the inductance of that phase will be at its maximum value, $L_{max}$. When no rotor poles overlap the stator poles of Phase A, the inductance of that phase will be at its minimum value, $L_{min}$. Between these two positions, the phase inductance is a smoothly varying function, as illustrated in FIG. 3.

Figure 4:
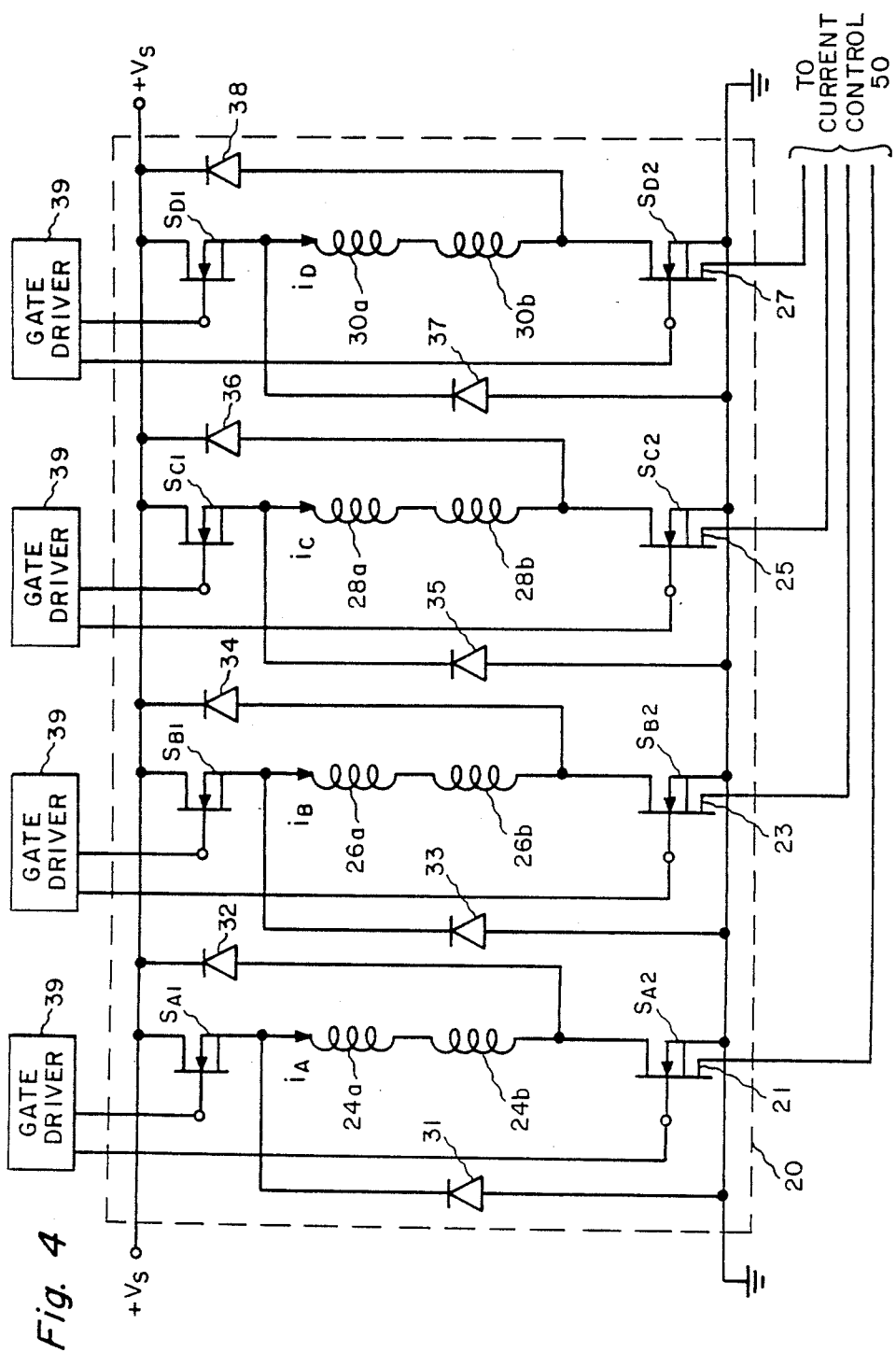
FIG. 4 schematically illustrates a power converter for the SRM of FIG. 2 employing integrated pilot current sensors according to the present invention.

Rotor rotation is produced by switching current on and off in each stator phase winding in a predetermined sequence synchronized with rotor position. Current in each stator phase is derived from a power converter, such as converter 20 of FIG. 4. The converter, which is driven by a DC source such as a battery or a rectified AC source, impresses a DC voltage $+V_S$ across the four parallel stator phase legs: Phase A, Phase B, Phase C, and Phase D. Motor phase windings 24a, 26a, 28a, and 30a are each respectively connected in series with an upper switch $S_{A1}$, $S_{B1}$, $S_{C1}$ and $S_{D1}$, respectively, while motor phase windings 24b, 26b, 28b and 30b are each respectively connected in series with a lower switch $S_{A2}$, $S_{B2}$, $S_{C2}$ and $S_{D2}$, respectively. Motor phase windings 24a, 26a, 28a and 30a also are each respectively connected in series with motor phase windings 24b, 26b, 28b and 30b, respectively. In the embodiment of FIG. 4, the upper and lower switches each comprise a metal oxide semiconductor field-effect transistor (MOSFET). However, other switching devices may be used, such as bipolar junction transistors (BJTs), gate turn-off thyristors (GTOs) and insulated-gate transistors (IGTs). In accordance with the present invention, the lower switches each incorporate a pilot current sensor, to be described hereinafter. Each phase winding 24a, 24b, 26a, 26b, 28a, 28b, 30a and 30b, respectively, is coupled to the DC source by return or flyback diodes 31-38, respectively. Gate drivers 39, such as IR2110 bridge drivers manufactured by International Rectifier, are preferably employed to ensure proper gating. Operation of all converter phases is identical. For example, when FETs $S_{A1}$ and $S_{A2}$ turn on, phase current $i_A$ builds up. When FETS $S_{A1}$ and $S_{A2}$ turn off at the commutation point (i.e., at the end of the conduction interval of Phase A), stored magnetic energy in the respective motor phase winding is returned to the DC source through the respective pair of diodes 31 and 32 connected thereto.

In a SRM, torque magnitude is controlled by varying the magnitude of phase currents. Torque direction is controlled by varying the application of current pulses with respect to rotor position. At constant current, the torque $T_e$ generated by a SRM is given by:

$$T_e = \tfrac{1}{2} I^2 \frac{dL}{d\theta} \qquad (1)$$

where I is the phase current, L is the phase inductance, and $\theta$ is the rotor angle.

Figure 5:
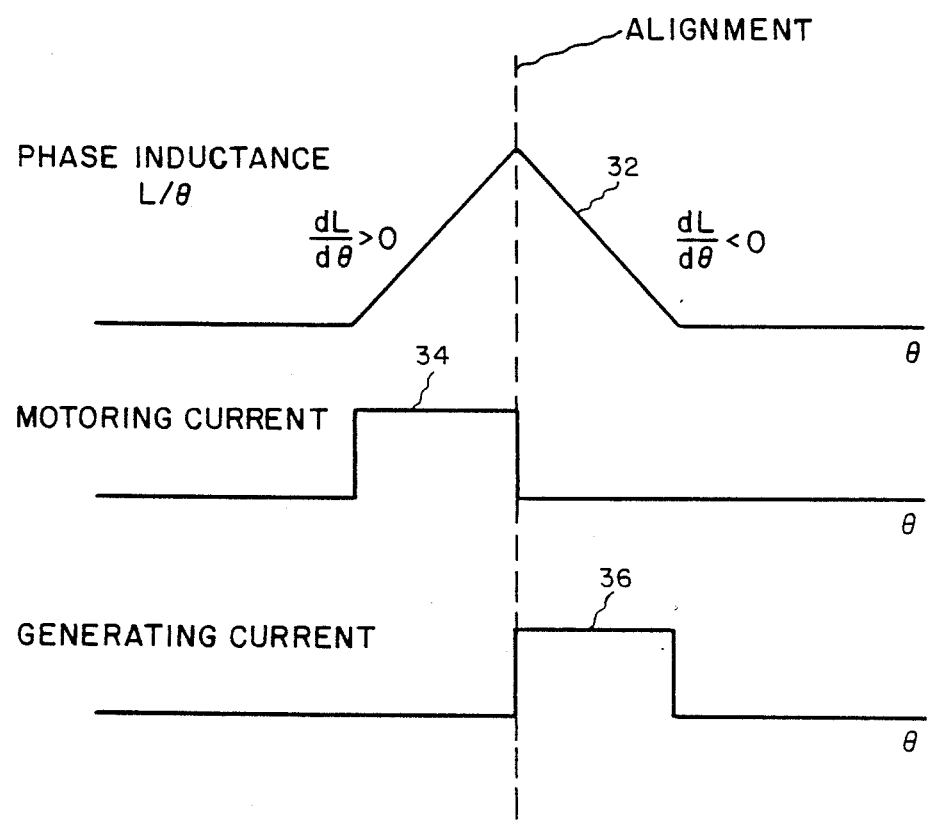
FIG. 5 graphically illustrates the idealized inductance profile as a function of rotor position for a stator pole pair of a typical SRM and the corresponding idealized stator phase current pulses for motoring and generating modes.

FIG. 5 shows the idealized inductance profile 32 of a stator pole pair (e.g. Phase A) with respect to rotor angular position. In accordance therewith, graphical representations of idealized stator phase motoring and generating currents 34 and 36, respectively, are also illustrated. If the current is on while the rotor and stator poles are approaching alignment, as illustrated by current waveform 34, then $dL/d\theta > 0$ and the torque is positive, signifying motoring operation. Alternatively, if the current is on when the poles are being pulled away from alignment, as illustrated by current waveform 36, then $dL/d\theta < 0$ and the torque is negative, corresponding to generating, or braking, operation. At high speeds, the motor back-EMF opposes the rise and fall of current in the phase, making it necessary to advance the current pulse to maintain maximum torque production. Turning the pulse on earlier allows the current to rise against a lower back-EMF, and turning it off sooner allows the current to decay before the rotor passes alignment, thereby preventing production of braking torque during motoring operation.

For each phase, there is an interval when that phase is not being excited for torque production; i.e., it is switched off. During that interval, it is possible to probe the idle winding with a low level signal to determine its input impedance. This process is hereinafter referred to as "impedance sensing".

The instantaneous relationship between voltage v and current I in a rotating machine is given by:

$$v = Ir + \frac{d\Psi}{dt} \qquad (2)$$

where $\Psi$ represents flux linkage, and r represents the stator resistance, or, in terms of current:

$$v = Ir + L\frac{di}{dt} + I\frac{dL}{dt} \qquad (3)$$

where L is the machine inductance seen from the stator terminals. In a switched reluctance motor, since the inductance L is a function of position:

$$v = Ir + L\frac{di}{dt} + I\frac{dL}{d\theta}\frac{d\theta}{dt}, \qquad (4)$$

and since rotor speed $$\omega = \frac{d\theta}{dt}$$

then $$v = Ir + L\frac{di}{dt} + I\omega\frac{dL}{d\theta}. \qquad (5)$$

In a phase immediately following turn-on, the phase current is small; thus the Ir drop and the back-EMF terms in the above equation (5) are small. The terminal voltage relationship thus can be approximated by:

$$v = L \frac{di}{dt}. \tag{6}$$

Figure 6:
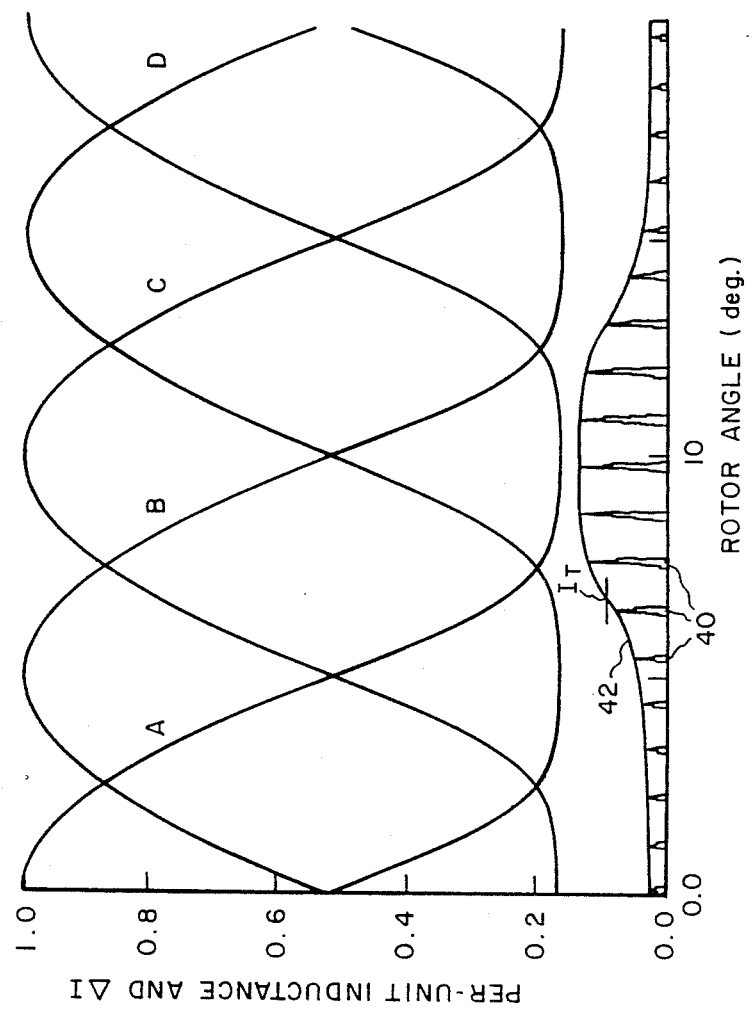
FIG. 6 is a graph illustrating a four-phase SRM inductance profile and further illustrating impedance sensing pulses according to the present invention.

Therefore, because the applied voltage and the time dt are fixed, the change in phase current resulting from the application of the sensing pulse is inversely proportional to the instantaneous value of the phase inductance. Because only discrete rotor positions must be detected for successful commutation, impedance sensing is accomplished simply by comparing the change in phase current ΔI to a threshold value. For example, as illustrated in FIG. 6, while Phase C is producing torque, Phase A is sensed by applying sensing pulses 40 thereto, thus producing Phase A sense current 42, in order to determine when to switch on Phase D. In particular, when the Phase A sense current 42 reaches threshold $I_T$, Phase D is switched on. Advantageously, for a four-phase motor, the application of sensing pulses to an idle phase which is separated from the excited winding by two stator phases results in less noise coupling of the sensed phase than for a three-phase motor because of the greater distance from the excited winding. Phase excitation can be advanced or retarded by reducing or increasing the threshold, respectively.

Figure 7:
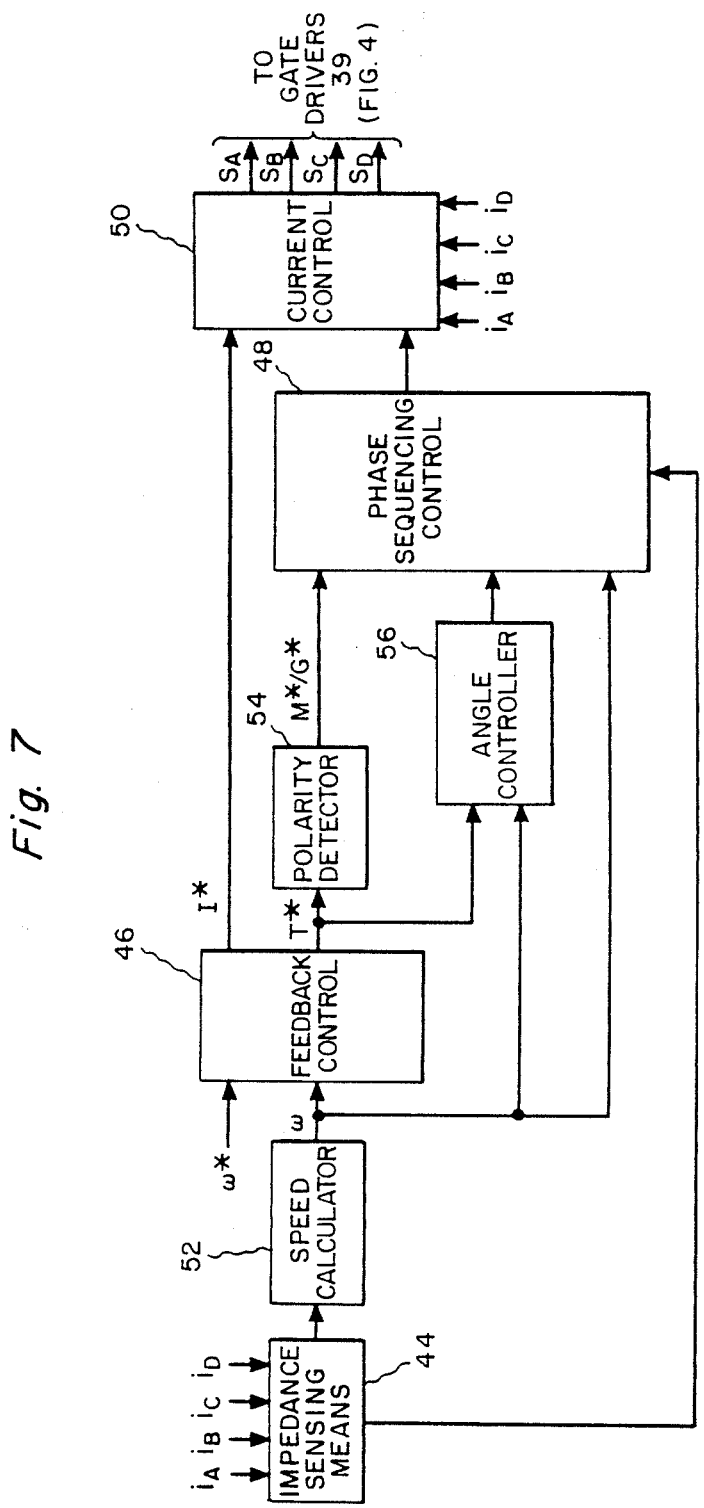
FIG. 7 is a functional block diagram of the SRM control system in accordance with the present invention.

The control system of a preferred embodiment of the present invention is illustrated in block diagram form in FIG. 7. The basic system includes impedance sensing means 44, feedback control 46, phase sequencing control 48, and current control 50. In addition, a speed calculator 52, a polarity detector 54, and an angle controller 56 are advantageously employed. In operation, the control system receives a velocity command ω* (i.e., speed and direction commands) from an operator and produces switching control signals for each stator phase. The switching control signals are synchronized with rotor position and optimized for the particular quadrant of operation (i.e. forward motoring, FM; forward generating, FG; reverse motoring, RM; or reverse generating, RG). A microcomputer, such as an Intel 8751 single-chip microprocessor, is preferably employed to perform speed control, impedance sensing and motor phase commutation. Current control, to be described hereinafter, is performed using peripheral analog hardware.

Figure 8:
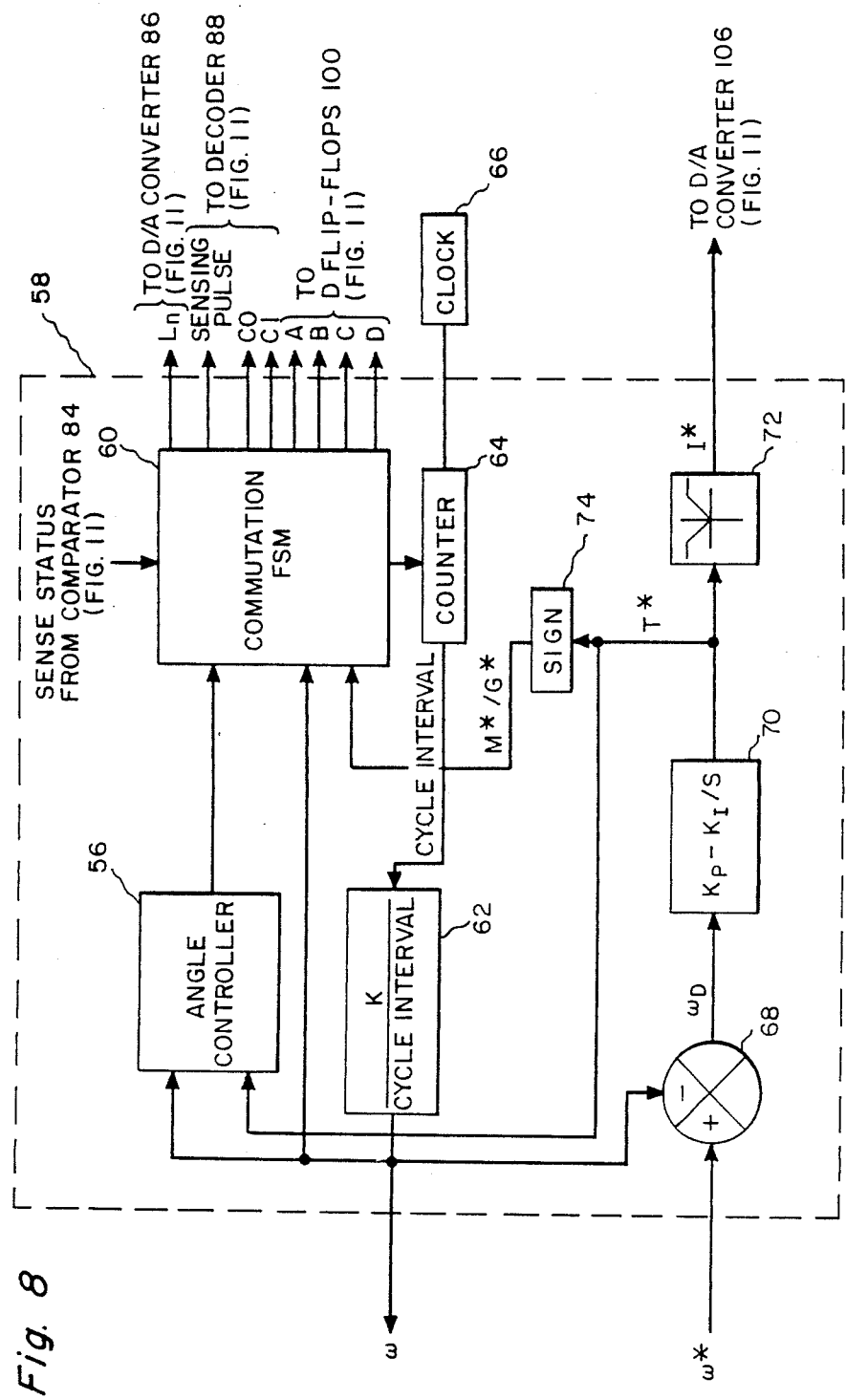
FIG. 8 is a functional block diagram of the microcomputer employed in the SRM control system of the present invention.

FIG. 8 shows a functional block diagram of a microcomputer 58 preferably employed in the control system of the present invention. As shown in block 62 of FIG. 8, calculation of the actual motor speed ω is accomplished by dividing a predetermined positive constant K by the time measured for one complete inductance cycle, or the cycle interval. An on-chip counter 64 clocked by a fixed frequency clock 66 measures the inductance cycle interval. As used herein, the term "inductance cycle interval" is defined as the sum of the periods of time required for each phase of the motor to complete one conduction interval in any quadrant of operation. A conduction interval for a particular phase is the time for which it is producing torque.

FIG. 8 also illustrates a speed control loop which can be used to implement feedback control 46 of FIG. 7. The speed control loop includes a comparator 68 for comparing speed command ω* with actual speed ω and generating a speed difference signal $ω_D$ therefrom. The speed difference signal is processed by a proportional-integral (PI) compensator 70 to produce a torque command T*. The torque command is applied to an absolute value circuit 72 to generate a current command I* which is provided to current control 50, shown in FIG. 7. The torque command is also applied to a polarity detector 74 to generate a mode command M*/G*. The mode command is used to differentiate between motoring and generating quadrants.

Angle controller 56, shown in FIG. 8 as part of microcomputer 58, controls the current by employing inductance threshold values to vary commutation angles. Thresholds are controlled as a function of motor speed and phase current. Further, these thresholds may be fixed or variable, depending upon whether motor speed is fixed or variable.

Figure 9:
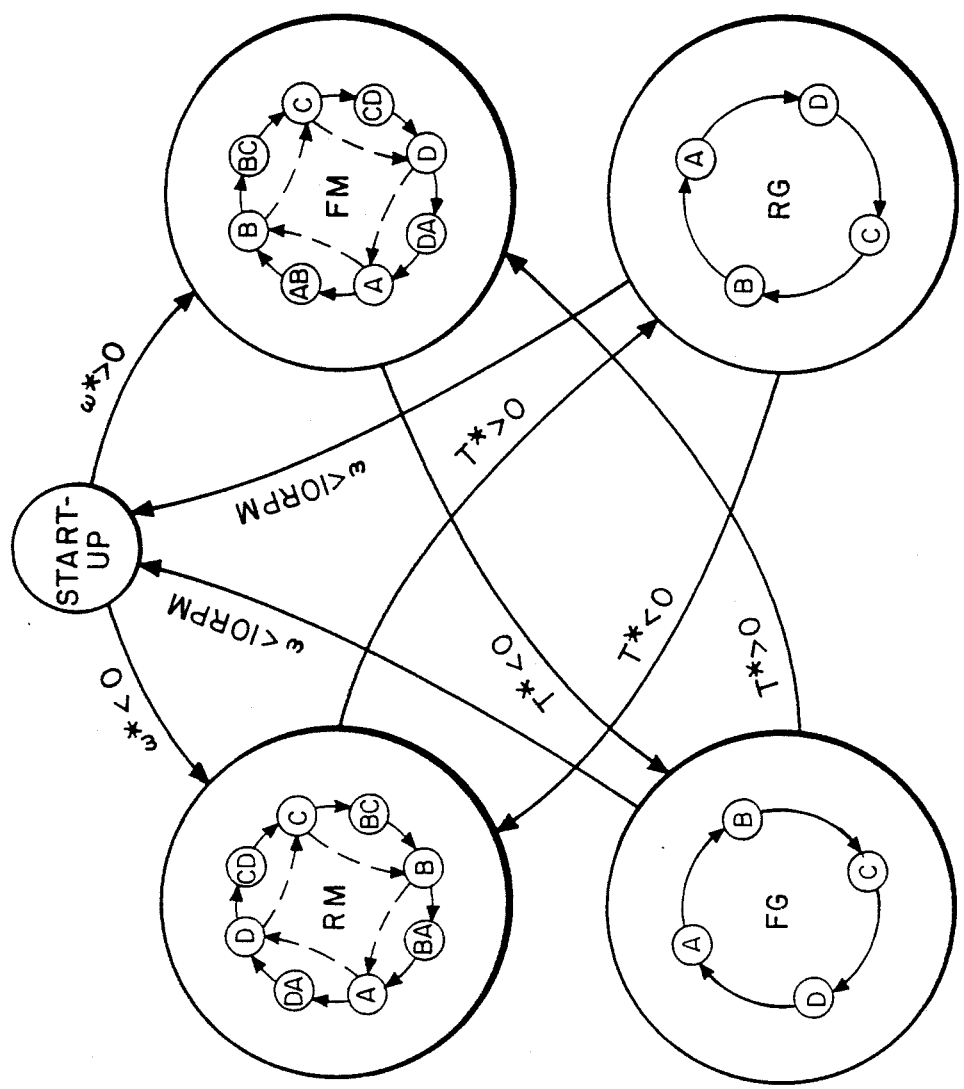
FIG. 9 is a sequence diagram for a SRM operating with the control system of the present invention.

The impedance sensing and phase sequencing algorithm of a preferred embodiment of the present invention is structured as a finite state machine (FSM), illustrated in FIG. 8 as commutation FSM 60. A simplified state map of the commutation FSM is illustrated in FIG. 9 wherein it is shown that a separate state exists for each commutation interval. Hence, as illustrated, for a four-phase machine, there are 25 states, including a start-up state. To achieve successful transitions among the four quadrants of operation, the conditions shown alongside the respective arrows must be satisfied.

In operation at speeds typically below a few revolutions per minute, e.g. 10 RPM, defined as the start-up mode, full torque is available. In the start-up mode, sensing pulses, such as pulses 40 illustrated above in FIG. 6 in reference to Phase A, are applied sequentially to each motor phase. The resultant change in current for each phase is compared to a respective start-up threshold. The results of these comparisons depend upon rotor position and determine which phase will be switched on first. Direction of rotation is determined by the operator inputted direction command which, for this embodiment, comprises the sign of the velocity command ω*. For example, at start-up, as shown in the state map of FIG. 9, if the sign of the velocity command ω*, is positive, then forward motoring will proceed with an A-B-C-D phase commutation sequence. Conversely, if the sign of the velocity command ω* is negative at start-up, then reverse motoring will proceed with a D-C-B-A phase commutation sequence. As illustrated, in the FM and RM modes, there may or may not be an overlap in conduction intervals for adjacent phases. Whether or not there are overlapping conduction intervals in the motoring modes depends upon the speed of operation. That is, overlapping conduction intervals are required at high speeds to establish higher phase currents and to maximize torque production. Specifically, at higher speeds, e.g. greater than 150 PRM, overlapping conduction intervals are necessary, and the phase sequence of operation is represented by the solid arrows. In contrast, at lower speeds, e.g. less than 150 RPM, there is no overlap, and the phase sequence of operation is represented by the dashed arrows. In the RG and FG modes, however, overlapping conduction intervals are clearly not necessary.

After start-up, there are two general phase sequencing or commutation algorithms for motoring and generating, respectively. These algorithms are the same for forward and reverse operation, except the sequence of phase commutation is reversed, as illustrated in FIG. 9. In particular, for forward operation, the sequence of phase commutation in both the motoring the generating modes is A-B-C-D. For reverse operation, the sequence of phase commutation D-C-B-A. Simplified sequence diagrams for the motoring and generating algorithms for a four-phase SRM are illustrated in FIGS. 10a and 10b, respectively. These algorithms are illustrated in terms of an inductance threshold $L_T$ which varies inversely with respect to the corresponding current threshold $I_T$. That is, from equation (6) above, since $$v = L\frac{di}{dt},$$

then the inductance threshold $$L_T = \frac{\Delta t}{I_T}. \tag{7}$$

This inductance threshold is varied, depending upon the speed and mode of operation. In FIGS. 10a and 10b, N represents the torque producing phase at start-up, and N+1 represents the next phase in the sequence to be commutated, depending upon forward or reverse operation. $L_{N+2}$ represents the inductance of the phase to which sensing pulses are being applied, i.e., the appropriate phase nonadjacent to the torque-producing phase. Moreover, as illustrated, there is generally an overlap in conduction intervals in a four-phase machine operating at high speeds wherein both Phase N and Phase N+1 conduct simultaneously. Overlapped commutation pulses are generated through use of a software timer which is part of the commutation FSM 60 (shown in FIG. 8), whereby the expiration of the timed interval is the condition that terminates the overlap. The overlap interval time depends upon the speed of operation and is set at a fixed fraction of the measured inductance cycle interval. At low speeds, however, no overlap is required; in such case, the overlap state is bypassed, as illustrated in FIG. 10.

In the FM mode, for example, if N represents torque-producing Phase A, then N+2 represents idle Phase C which will be sensed by applying sensing pulses thereto. When the inductance of Phase C ($L_c$) is less than the inductance threshold $L_T$, then the next phase to be switched on is Phase N+1, or Phase B. At the commutation point of Phase B, if the motor speed is high, as hereinabove explained, there is an overlap in the conduction intervals of Phase A and Phase B. Upon expiration of the overlap interval, Phase A is switched off, and Phase B continues as the torque-producing phase.

In the RG mode, for example, if Phase N represents torque-producing Phase D, then N+2 represents idle Phase B which will be sensed by applying sensing pulses thereto. When the inductance on Phase B ($L_B$) is greater than the inductance threshold $L_T$, then Phase N+1, or Phase C, will be switched on as Phase D is switched off. As explained hereinabove, overlapping conduction intervals are not required in the generating modes.

Figure 11:
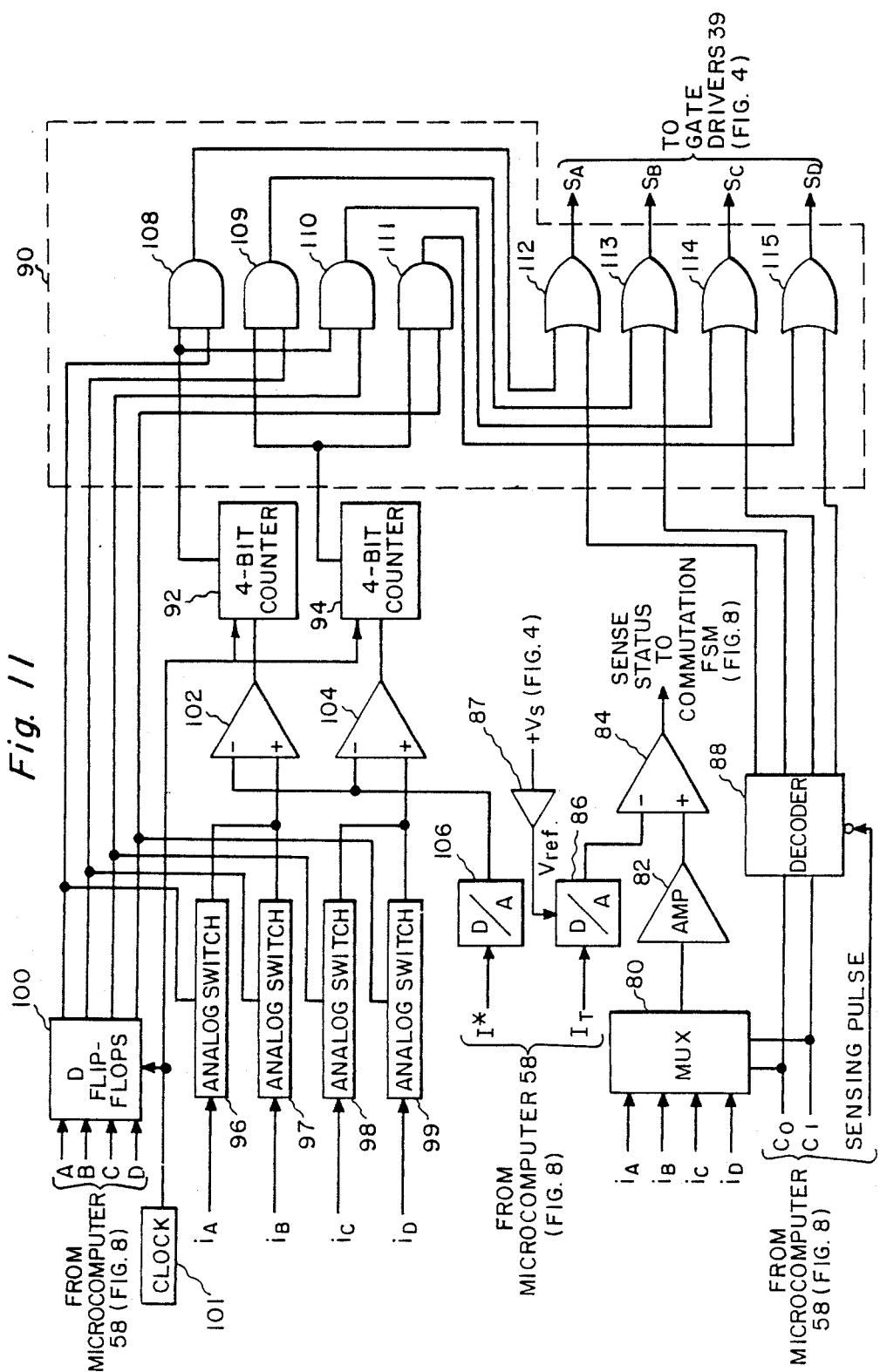
FIG. 11 is a block diagram of hardware peripheral to the microcomputer employed in the present invention.

FIG. 11 shows peripheral hardware employed in the preferred implementation of the impedance sensing and current control functions of the present invention. With regard to the impedance sensing function, sensed phase current signals $i_A$, $i_B$, $i_C$ and $i_D$, respectively, from lower switches $S_{A2}$, $S_{B2}$, $S_{C2}$, and $S_{D2}$, respectively (shown in FIG. 4), are supplied to a multiplexer 80. Control signals C0 and C1 from microprocessor 58 (shown in FIG. 8) enable multiplexer 80 to switch the proper sense phase current through a high-gain amplifier 82 to the non-inverting input of a comparator 84. The high-gain amplifier is employed because the sense current pulses, illustrated above in FIG. 6, are relatively low. Current sense threshold $I_T$ is supplied to the inverting input of comparator 84 via digital-to-analog converter 86. The digital-to-analog converter 86 is of the multiplying type for which the reference voltage $V_{ref}$ is linearly derived from the DC source voltage $+V_S$ through an operational amplifier 87. Digital-to-analog converter 86 thus supplies a voltage to the inverting input of comparator 84 which is proportional to the change in current $$\Delta I \left( = V_S \frac{\Delta t}{L_T} \right)$$

resulting from application of the DC source voltage for a given time $\Delta t$ at a predetermined rotor position corresponding to a particular phase inductance, as described hereinabove. Every sampling period, e.g. 200 microseconds, comparator 84 compares the sense current, i.e. the change in current resulting from the application of sensing pulses, to the respective current sense threshold. The sense status is then provided to the commutation FSM portion of microprocessor 58. Decoder 88 steers the sensing pulse from microprocessor 58 to the proper converter phase through logic circuitry 90.

In accordance with the present invention, phase commutation depends upon both the impedance sensing function, described hereinabove, and current control, which will now be described. As hereinabove discussed, conventional SRM converters incorporate discrete current sensors, such as Hall effect or resistive current sensors. These discrete current sensors are not required in a preferred embodiment of the present invention. Instead, the lower MOSFET switch $S_{A2}$, $S_{B2}$, $S_{C2}$ and $S_{D2}$ in each phase leg, as shown in FIG. 4, incorporates a pilot current sensor. The pilot sensor in each MOSFET comprises an isolated group of sense cells within the main switching device. The group of sense cells in each switching device has a source terminal connected to a separate sense pin 21, 23, 25 and 27, as illustrated in FIG. 4. At each sense pin, a current emulator is provided, such as that of the power semiconductor device shown and described in commonly assigned U.S. Pat. No. 4,783,690, issued to J. P. Walden and E. J. Wildi on Nov. 8, 1988, which is incorporated by reference herein, so that the current output is proportional to the main device current by the ratio of the number of sense cells to the total number of cells in the device. For example, a typical ratio is 1,500:1. The output current of each pilot current sensor is conditioned by signal conditioners (not shown). An exemplary implementation of such a signal conditioner comprises a current-to-voltage converter and an amplifier.

When the lower power switches are off, there is no output signal from the pilot current sensors, so that traditional hysteresis or ramp-comparison current regulation cannot be employed. Thus, in accordance with the present invention, a fixed off-time current regulation strategy is used and implemented by the circuitry of FIG. 11. Counters 92 and 94 fix the off-time for current regulation. Analog switches 96–99 are controlled by microcomputer 58 (FIG. 8) through D (delay) flip-flop 100 to route the phase current signals from the signal conditioners to current regulators or comparators 102 and 104. Only two current regulators are necessary for a four-phase SRM drive, since only two phases can be enabled at any one time. When a respective phase current reaches the setpoint of the corresponding comparator, which is determined by the current command I* acquired by digital-to-analog converter 106, the respective counter issues a control signal to gate driver logic circuit 90. The upper and lower switches for the respective phases, shown in FIG. 4, are thus turned off for a fixed time interval. Following the off-time interval, the switches are turned on, and the process repeats. The preferred embodiment of the present invention further includes a minimum on-time circuit to ensure that noise signals at device turn-on do not produce an undesirable system response This is accomplished by gating the switches in synchronism with a clock 101, e.g. a 133 KHz clock, to thereby provide one complete clock cycle delay before the comparator output signals are sampled by counters 92 and 94.

As illustrated, one embodiment of gate control logic circuit 90 comprises four two-input AND gates 108–111 and four two-input OR gates 112–115. The outputs of AND gates 108–111, respectively, are inputs to OR gates 11214 115, respectively. The other input to each OR gate is an output line from decoder 88. In operation, when control signals C0 and C1 from microcomputer 58 indicate that an idle phase, e.g. Phase A, is to be sensed, a high logic level signal will be applied by decoder 88 to an input line of the respective OR gate, i.e. OR gate 112 for Phase A. Since one input to the respective OR gate is a high logic level signal, the value of the logic level signal supplied from the current control portion of the circuit of FIG. 11 is irrelevant, as will be appreciated by those of ordinary skill in the art, and sensing pulses will be applied to the corresponding motor phase. Conversely, when a particular phase is to be excited for torque production, the output of decoder 88 corresponding to that phase is a low logic level signal. In such case, the value of the logic level signal from the current control portion of the circuit of FIG. 11 determines the state of the input signals to the corresponding switching devices. For example, if Phase A is to be excited for torque production, a high logic level signal will be supplied to AND gate 108 by D flip-flop 100. The other input signal to AND gate 108 will alternate between 0 and 1 in accordance with the fixed off-time current chopping strategy described hereinabove, thereby regulating Phase A current during the conduction interval thereof. It will be appreciated by those skilled in the art that other equivalent logic circuitry may be employed.

Figure 12:
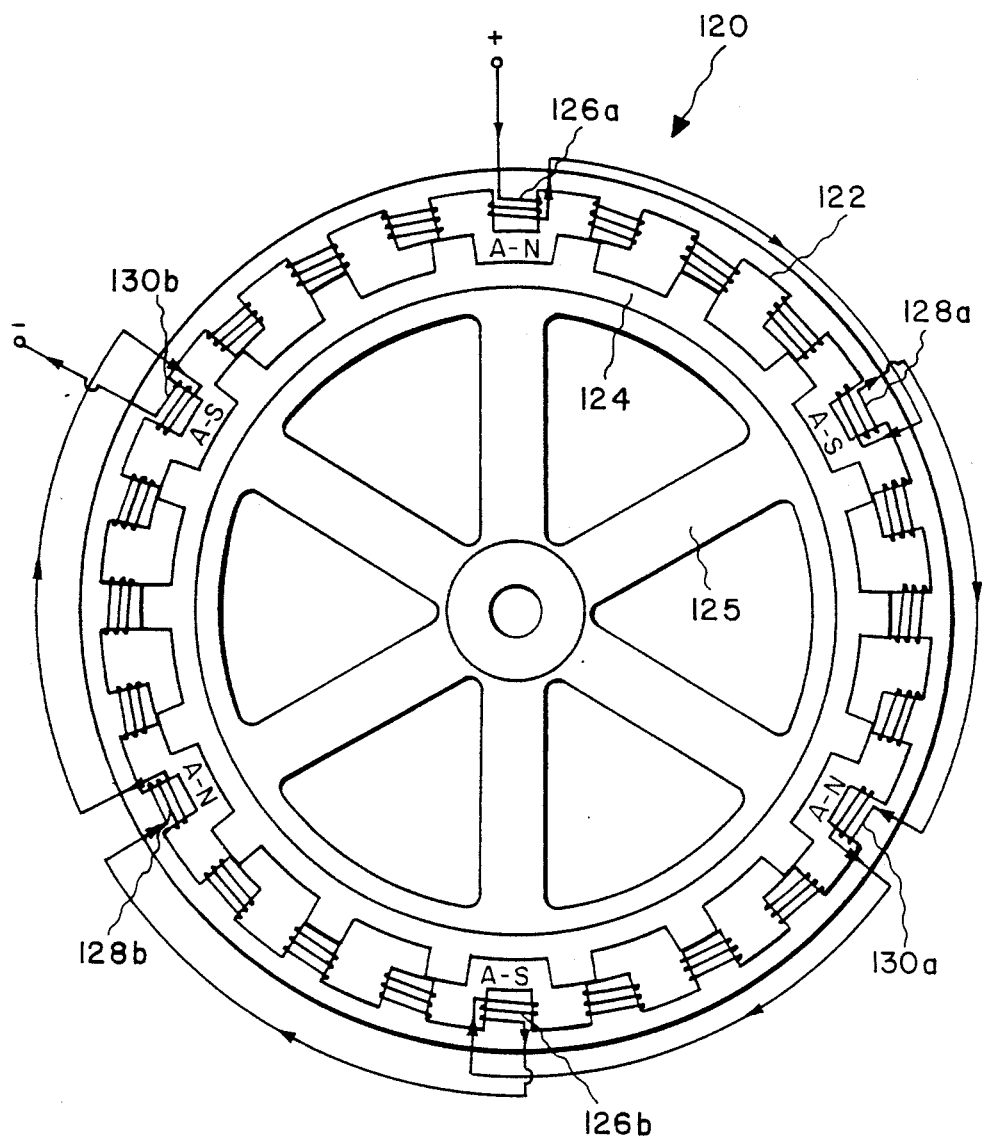
FIG. 12 is a cross-sectional view of the preferred embodiment of a high-torque SRM employed in a laundering machine constructed in accordance with the present invention.

The above-described SRM drive system of the present invention may be advantageously employed in a laundering machine. The preferred embodiment of the laundering machine employs a large-diameter, high-torque SRM 120, as shown in FIG. 12. More specifically, the preferred SRM is a four-phase machine including a stator 122 with 24 poles and a rotor 124 with 18 poles, thus comprising three magnetic structural repetitions of the fundamental geometry of the SRM FIG. 2. The preferred structure of hub 125 is also illustrated. A concentrated multiturn coil winding is wound around each stator pole. Each stator phase comprises 6 stator coil windings, one on every fourth pole of the stator connected alternately north and south in series. For example, as illustrated in FIG. 12, Phase A comprises winding pairs 126a–126b, 128a–128b and 130a–130b connected in series, each pair including a north pole A-N and a south pole A-S. The magnetic structure and relatively large diameter of the preferred SRM enable the system to achieve high-torque without requiring high phase currents, thus being advantageous for use in a laundering machine.

Figure 13:
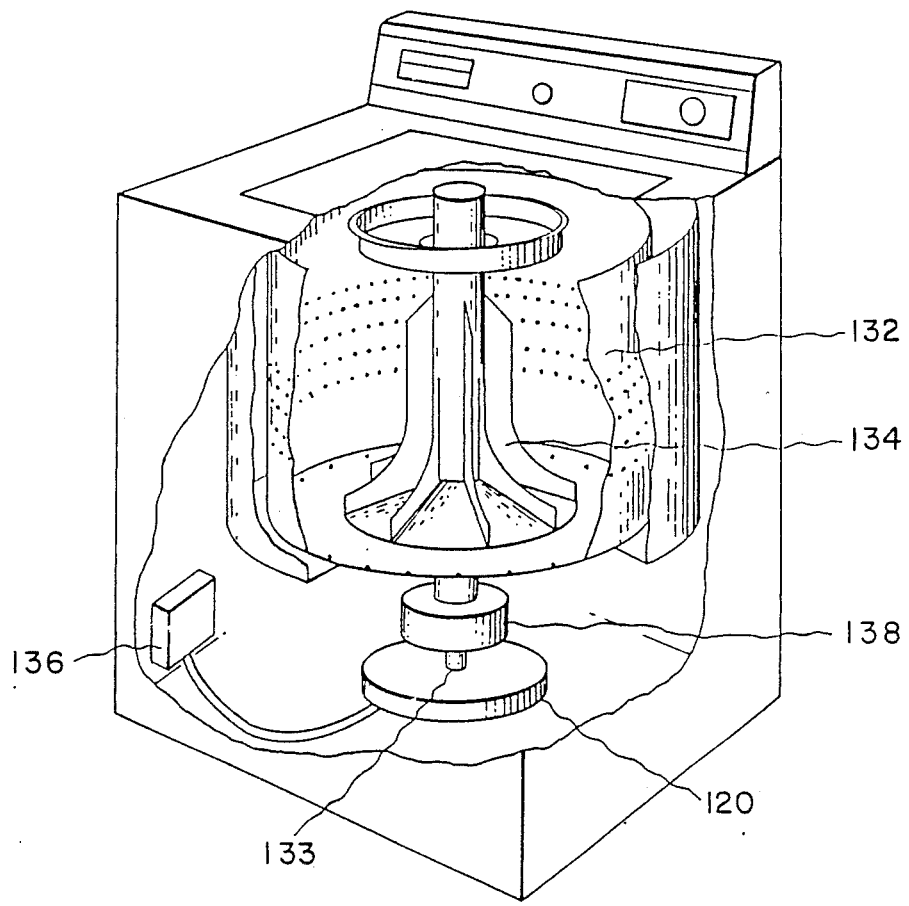
FIG. 13 is a partially cutaway view of a laundering machine constructed in accordance with the present invention.

As illustrated in FIG. 13, a laundering machine according to a preferred embodiment of the present invention comprises a SRM 120 of the type hereinabove described mounted on the vertical axis of a agitator 134. A direct drive shaft 133 couples SRM 120 to laundry basket 132. The SRM and its associated drive system are employed to drive basket 132 and agitator 134 directly, thus replacing the conventional constant-speed induction motor and transmission. The drive system 136 illustrated in FIG. 13 includes the power electronics, microcomputer and peripheral hardware, described hereinabove in accordance with the present invention. The laundering machine of the present invention incorporates a conventional agitator-basket system wherein the agitator and basket spin together in the spin mode, and the agitator oscillates within a stationary basket during the agitate mode. To this end, as illustrated in FIG. 13, a mode-shifter, e.g. a clutch 138, locks agitator 134 to basket 132 during the spin mode. Clutch 138 disengages in the agitate mode so that agitator 134 oscillates, while basket 132 remains stationary.

In operation, as in conventional laundering machines, there are an agitate mode and a spin mode. During the agitate mode, the SRM cycles through the four quadrants of operation as the agitator oscillates within the stationary basket at low speed. Initially, in the FM quadrant, energy flows from the DC source to the motor until a predetermined maximum speed is reached (e.g. 125 RPM). Operation then proceeds in the FG quadrant in which energy flows from the motor to the DC source. A cycle is completed with operation in the reverse direction, i.e. the RM and RG quadrants, respectively. During the spin mode, the basket and agitator are unidirectionally rotated at a relatively high speed (e.g. 600 RPM) with the SRM alternating between the FM mode (i.e., to accelerate the basket and agitator) and the FG mode (i.e., to decelerate the basket and agitator at completion of the spin mode).

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. In combination, a closed-loop drive system for a multiphase switched reluctance motor including a rotor having a plurality of rotor poles and a stator having a plurality of pairs of opposing stator poles, each respective phase of said motor comprising at least one of said pairs of opposing stator poles with a motor phase winding wound thereon, each said motor phase winding being connected in series with at least one corresponding current switching device, said switched reluctance motor being capable of four quadrant operation, said drive system comprising:

a plurality of current sensing means, each respective one of said current sensing means coupled to the corresponding current switching device for sensing instantaneous current in the motor phase winding connected thereto and for generating phase current signals proportional to said instantaneous current;

a plurality of indirect impedance sensing means, each respective one of said impedance sensing means coupled to the corresponding current sensing means of the respective phase of said motor for receiving said phase current signals and generating rotor position information signals in accordance therewith;

speed calculation means for generating actual motor speed signals from said rotor position information signals;

feedback control means for receiving and processing said actual motor speed signals from said speed calculation means and for receiving an operator command to generate a current command, a torque command and a mode command;

angle control means connected to said feedback control means for receiving and converting said torque command and said motor speed signals into a pulse train of conduction angle pulses synchronized with rotor position for each respective phase of said motor, the pulse trains for the respective phases of said motor being mutually phase-shifted;

phase sequencing control means for receiving and processing said motor speed signals and said mode command, said phase sequencing control means coordinating said pulse trains, said motor speed signals and said mode command with a particular quadrant of motor operation; and current control means for receiving and comparing said current command from said feedback control means with said phase current signals to generate a current magnitude limiting signal for each respective phase of said motor.

2. The drive system of claim 1 wherein each said impedance sensing means comprises:
means for applying short duration sensing pulses to an initially unenergized motor phase;
means for sensing a change in phase current in the corresponding phase winding resulting from the application of said sensing pulses over a sampling period; and
comparison means for comparing said change in phase current to a predetermined threshold current.

3. The drive system of claim 2 wherein the duration of each said sensing pulse is sufficiently short to produce only negligible build-up of phase current and negligible motion of the rotor.

4. The drive system of claim 1, further comprising:
start-up control means for receiving and processing said operator command and the rotor position information signals from each said impedance sensing means to generate a start-up pulse for at least one selected motor phase, said selected motor phase depending upon initial rotor position and the operator command.

5. The drive system of claim 1 wherein said current control means includes:
clock means for turning off each said corresponding current switching device for a predetermined time when the respective phase current signal therethrough exceeds said current magnitude limiting signal.

6. The drive system of claim 5 wherein said current control means further includes:
second clock means for ensuring that each said corresponding current switching device remains turned on for a second predetermined time.

7. The drive system of claim 4 wherein said speed calculation means, said feedback control means, said phase sequencing control means, said start-up control means, and said angle control means together comprise a programmable microcomputer.

8. The drive system of claim 1 wherein the operator command comprises a speed command and a direction command and wherein said feedback loop comprises a speed feedback loop.

9. The drive system of claim 1 in combination with a power converter for impressing a DC voltage across parallel motor phase windings, the current switching device of each respective motor phase being responsive to the pulse train of conduction angle pulses for each respective motor phase.

10. The drive system of claim 9 wherein said current switching devices comprise transistors and the pulse train of conduction angle pulses for each respective motor phase is applied to the base of the respective transistor.

11. Laundering apparatus comprising:
fabric-moving means operable in an agitate mode for agitating fluid and fabrics and operable in a spin mode for spinning the fabrics to effect centrifugal displacement of fluid and particulate matter from the fabrics;
a multiphase switched reluctance motor including a stator having a plurality of pairs of opposing stator poles and a rotor having a plurality of rotor poles, each respective phase of said motor comprising at least one of said pairs of opposing stator poles and a motor phase winding wound thereon, said motor phase windings being connected in parallel to each other, said switched reluctance motor being adapted for operating in four quadrants;
means coupling said fabric-moving means to said motor;
drive means coupled to said control means for commutating the respective phases of said motor in a plurality of preselected sequences for driving said switched reluctance motor to operate said fabric-moving means in said agitate mode and said spin mode, said drive means including a power converter for impressing a DC voltage across said parallel-connected motor phase windings, said power converter including at least one current switching device connected in series with each said motor phase winding; and
control means for controlling said switched reluctance motor to operate in said four quadrants;
said control means comprising a plurality of current sensing means, each respective one of said current sensing means coupled to the corresponding current switching device for sensing instantaneous current in the motor phase winding connected thereto and for generating phase current signals proportional to said instantaneous current;
said control means further comprising a plurality of indirect impedance sensing means, each respective one of said impedance sensing means coupled to the corresponding current sensing means of the respective motor phase for receiving said phase current signals and generating rotor position information signals in accordance therewith for determining when to commutate the respective phase of said motor.

12. The laundering apparatus of claim 11 wherein said control means further comprises:
speed calculation means for generating actual motor speed signals from said rotor position information signals;

feedback control means for receiving and processing said actual motor speed signals from said speed calculation means and for receiving an operator command to generate a current command, a torque command and a mode command;

angle control means connected to said feedback control means for receiving and converting said torque command and said motor speed signals into a pulse train of conduction angle pulses synchronized with rotor position for each respective motor phase, the pulse trains for the respective phases of said motor being mutually phase-shifted;

phase sequencing control means for receiving and processing said motor speed signals and said mode command, said phase sequencing control means coordinating said pulse trains, said motor speed signals and said mode command with a predetermined quadrant of motor operation; and current control means for receiving and comparing said current command from said feedback control means with said phase current signals to generate a current magnitude limiting signal for each respective motor phase.

13. The laundering apparatus of claim 12 wherein each said impedance sensing means comprises:
means for applying short duration sensing pulses to an initially unenergized motor phase winding;
means for sensing a change in phase current in the corresponding phase winding resulting from the application of said sensing pulses over a sampling period; and
comparison means for comparing said change in phase current to a predetermined threshold current.

14. The laundering apparatus of claim 13 wherein the duration of each said sensing pulse is sufficiently short to produce only negligible build-up of phase current and negligible motion of the rotor.

15. The laundering apparatus of claim 12, further comprising:
start-up control means for receiving and processing said operator command and the rotor position information signals from each said impedance sensing means to generate a start-up pulse for at least one selected motor phase, said selected motor phase depending upon initial rotor position and the operator command.

16. The laundering apparatus of claim 12 wherein said current control means includes:
clock means for turning off the respective current switching device for a predetermined time when the respective phase current signal exceeds said current magnitude limiting signal.

17. The laundering apparatus of claim 16 wherein said current control means further includes:
second clock means for ensuring that the respective current switching device remains turned on for a second predetermined time.

18. The laundering apparatus of claim 15 wherein said speed calculation means, said feedback control means said phase sequencing control means, said start-up control means, and said angle control means together comprise a programmable microcomputer.

19. The laundering apparatus of claim 12 wherein the operator command comprises a speed command and a direction command and wherein said feedback loop comprises a speed feedback loop.

20. The laundering apparatus of claim 11 wherein each said current switching devices comprise a transistor.

21. The laundering apparatus of claim 11 wherein said switched reluctance motor comprises a four-phase motor.

22. The laundering apparatus of claim 21 wherein said stator comprises twelve pairs of opposing stator poles and wherein said rotor comprises nine pairs of rotor poles, each of said stator poles having a phase winding wound thereon, each respective phase of said motor comprising three of said pairs of opposing stator poles, each said pair of stator poles, respectively, comprising a magnetic north pole and a magnetic south pole, the phase windings of the north and south stator poles of each motor phase being connected alternately in series.

23. The laundering apparatus of claim 11 wherein:
said fabric-moving means comprises a laundry basket for containing the fluid and fabrics and an agitator coaxially situated within said laundry basket; and
said means coupling said fabric-moving means to said motor comprises a direct drive shaft and mode-shifting means for locking said agitator to said laundry basket for operation in said spin mode and for disengaging said laundry basket from said agitator for operation in said agitate mode.

24. The laundering apparatus of claim 23 wherein said mode-shifting means comprises a clutch.

25. A method for operating laundering apparatus including fabric-moving means operable in an agitate mode for agitating fluid and fabrics and operable in a spin mode for spinning the fabrics to effect centrifugal displacement of fluid and particulate matter from the fabrics, said laundering apparatus including a multiphase switched reluctance motor for driving said fabric-moving means, said switched reluctance motor including a rotor having a plurality of rotor poles and a stator having a plurality of pairs of opposing stator poles, each respective phase of said motor comprising at least one of said pairs of opposing stator poles with a motor phase winding wound thereon, said motor phase windings being connected in parallel to each other, said laundering apparatus further comprising a power converter for impressing a DC voltage across said parallel-connected motor phase windings, said power converter including at least one respective switching device connected in series with each said motor phase winding said method comprising the steps of:
sensing instantaneous current in each said motor phase winding and generating phase current signals representative thereof;
sensing the impedance of each said motor phase winding by receiving said phase current signals and generating rotor position information signals in accordance therewith;
generating actual motor speed signals from said rotor position information signals;
receiving an operator command to generate a current command, a torque command and a mode command;
converting said torque command and said motor speed signals into a pulse train of conduction angle pulses synchronized with rotor position for each respective phase of said motor, the pulse trains for the respective phases of said motor being mutually phase-shifted;
coordinating said pulse trains, said motor speed signals and said mode command with a predetermined quadrant of motor operation for driving said switched reluctance motor to operate said fabric-moving means in said agitate mode and said spin mode; and comparing said current command with said phase current signals to generate a current magnitude limiting signal for each respective phase of said motor.

26. The method of claim 25 wherein the step of sensing the impedance of each respective phase comprises:

applying short duration sensing pulses to an initially unenergized motor phase winding;

sensing a change in phase current in said initially unenergized motor phase winding resulting from the application of said sensing pulses over a sampling period; and comparing the change in phase current to a predetermined threshold current, the change in phase current being proportional to the impedance of said initially unenergized motor phase winding.

27. The method of claim 26 wherein the duration of each said sensing pulse is sufficiently short to produce only negligible build-up of phase current and negligible motion of the rotor.

28. The method of claim 25, further comprising the steps of:

receiving and processing said operator command and the rotor position information signals from each said impedance sensing means to generate a start-up pulse for at least one selected phase of said motor, said selected phase depending upon initial rotor position and the operator command.

29. The method of claim 25, further comprising the step of:

turning off each said corresponding current switching device for a predetermined time when the respective phase current signal therethrough exceeds said current magnitude limiting signal.

30. The method of claim 25, further comprising the step of:

ensuring that each said corresponding current switching device remains turned on for a second predetermined time.

* * * * *